United States Patent
Scott, II

(10) Patent No.: US 6,282,423 B1
(45) Date of Patent: Aug. 28, 2001

(54) WIRELESS COMMUNICATION SYSTEM WITH SELECTABLE SIGNAL ROUTING AND METHOD THEREFOR

(75) Inventor: Louis William Scott, II, Fairfield, OH (US)

(73) Assignee: GTE Wireless Service Corporation, Alpharetta, GA (US)

(*) Notice: Subject to any disclaimer, the term of this patent is extended or adjusted under 35 U.S.C. 154(b) by 0 days.

(21) Appl. No.: 09/151,540

(22) Filed: Sep. 11, 1998

(51) Int. Cl.[7] .................................................. H04Q 7/20
(52) U.S. Cl. .......................... 455/439; 455/554; 455/555; 455/560; 455/561
(58) Field of Search ................... 455/439, 554, 455/555, 560, 422, 426, 445, 462, 561, 436

(56) References Cited

U.S. PATENT DOCUMENTS

| | | | |
|---|---|---|---|
| 5,285,469 | * 2/1994 | Vanderpool | 455/426 |
| 5,363,404 | * 11/1994 | Kotzin | 455/422 |
| 5,768,268 | * 6/1998 | Kline et al. | 455/42 |
| 5,913,166 | * 6/1999 | Buttitta et al. | 455/436 |
| 6,009,328 | * 12/1999 | Muszynski | 455/442 |
| 6,070,052 | * 5/2000 | Ogasawara et al. | 455/450 |
| 6,108,547 | * 8/2000 | Yamashita et al. | 455/439 |
| 6,122,294 | * 9/2000 | Hsu et al. | 340/477 |

OTHER PUBLICATIONS

DSC Communications Website, www.dsccc.com/microdx.htm, Jul. 1, 1998.
Paragon Networks International Website, www.paragon–networks.com/html/app–wireless.htm, Jul. 1, 1998.
Paragon Networks International Website, www.paragon–networks.com/html/app–wireless–cellback.html, Jul. 1, 1998.
Paragon Networks International Website, www.paragon–networks.com/html/prod–transmaster.htm, Jul. 1, 1998.
Paragon Networks International Website, www.paragon–networks.com/html/specs–transmaster.html, Jul. 1, 1998.

* cited by examiner

Primary Examiner—Nay Maung
Assistant Examiner—Lewis West
(74) Attorney, Agent, or Firm—James K. Weixel

(57) ABSTRACT

A private wireless communication system (56) is interconnected with a public switched telecommunications network (PSTN). The wireless system (56) includes a mobile telephone switching office (MTSO) (58). A first cell site (60) interconnects with the MTSO (58) through a first PSTN-provided T-1 transmission link 64. A second cell site (62) interconnects with the MTSO (58) through a second PSTN-provided T-1 transmission link (66), and with the first cell site (60) through a third PSTN-provided T-1 transmission link (68). Additionally, the first cell site (60) interconnects with a local exchange carrier (LEC) end office (72) of the PSTN through a fourth PSTN-provided T-1 transmission link (70). The first and second cell sites (60, 62) are located in a local service area (80) of the LEC end office (72), and the MTSO (58) is configured to selectively route communication signals over first, second, third, and fourth PSTN-provided T-1 links (64, 66, 68, 70).

29 Claims, 5 Drawing Sheets

| DS-0 CHANNEL | CHANNEL ALLOCATION |
|---|---|
| \multicolumn{2}{l}{PSTN T-1 LINK (MTSO ↔ 1ST BASE STATION)} |
| 0<br>2<br>⋮<br>7 | CONTROL CHANNEL 1<br>WIRELESS VOICE/DATA 1 |
| 8<br>9<br>⋮<br>15 | CONTROL CHANNEL 2<br>WIRELESS VOICE/DATA 2 |
| 16<br>17<br>⋮<br>23 | INTRA-LOCAL EXCHANGE CALLS (×2) [FROM MTSO] |
| \multicolumn{2}{l}{PSTN T-1 LINK (MTSO ↔ 2ND BASE STATION)} |
| 0<br>2<br>⋮<br>7 | CONTROL CHANNEL 2<br>WIRELESS VOICE/DATA 2 |
| 8<br>9<br>⋮<br>15 | CONTROL CHANNEL 1<br>WIRELESS VOICE/DATA 1 |
| 16<br>17<br>⋮<br>23 | INTRA-LOCAL EXCHANGE CALLS (×2) [FROM MTSO] |
| \multicolumn{2}{l}{PSTN T-1 LINK (1ST BASE STATION ↔ 2ND BASE STATION)} |
| 0<br>2<br>⋮<br>7 | CONTROL CHANNEL 1<br>WIRELESS VOICE/DATA 1 |
| 8<br>9<br>⋮<br>15 | CONTROL CHANNEL 2<br>WIRELESS VOICE/DATA 2 |
| 16<br>17<br>⋮<br>23 | INTRA-LOCAL EXCHANGE CALLS (×2) [FROM B.S.] |

FIG. 7

WIRELESS COMMUNICATION SYSTEM WITH SELECTABLE SIGNAL ROUTING AND METHOD THEREFOR

TECHNICAL FIELD OF THE INVENTION

The present invention relates generally to wireless communication systems which interconnect with a public switched telecommunications network (PSTN). More specifically, the present invention relates to selectable routing of wireless communication signals along PSTN communication paths.

BACKGROUND OF THE INVENTION

A wireless communication (e.g. cellular, PCS, and so forth) system generally consists of three components, a mobile telephone switching office (MTSO), a number of cell sites, and a number of radiotelephones. Typically, a radiotelephone communicates over a radiofrequency link to a base transceiver station portion of a cell site. The cell site provides the interface between the MTSO and the radiotelephone and interconnects with the MTSO through a high-speed digital transmission link. This high-speed digital transmission link is configured to carry both voice conversations and data, as well as cell site control information between the MTSO and the cell site.

The MTSO is the coordinating element for the cell sites in the cellular system. The MTSO conventionally contains a processor and a cellular switch for connecting cellular subscribers to other cellular subscribers and to external networks, such as the public switched telephone network (PSTN). The MTSO is interconnected to a wireline central office of the PSTN using high-speed digital transmission links configured to carry voice conversations.

The high-speed digital transmission links between each of the cell sites and the MTSO are conventionally microwave links or PSTN-provided T-1 wirelines. The high-speed digital transmission links between the MTSO and the wireline central office are conventionally PSTN-provided T-1 wirelines. The conventional T-1 wireline has a capacity of 1.544 Mbps and accommodates twenty-four digital service, level 0 (DS-0) channels. Each DS-0 channel can transmit at a rate of 64 kbps, which is the worldwide standard speed for digitizing one voice conversation using pulse code modulation (PCM).

Typically, a cell site will not utilize all twenty-four DS-0 channels of the T-1 wireline which interconnects the cell site to the MTSO. More likely, the cell site will utilize fourteen or less DS-0 channels while the remaining DS-0 channels are unused. Thus, the unused DS-0 channels represent an inefficient use of the leased PSTN T-1 wireline. This inefficient usage undesirably drives up cellular system costs.

Another problem with this cellular system interconnection configuration is that when transmission over a T-1 wireline between the MTSO and a cell site is interrupted, the cell site becomes nonoperational for interfacing wireless calls to the PSTN and other cell sites. In other words, subsequent calls between that cell site and the PSTN or other cell sites cannot be completed. The cell site becomes nonoperational because a transmission interruption results in a loss of communication of the cell site control information between the cell site and the MTSO. Transmission over the T-1 wireline can become interrupted for a number of reasons, such as, a break in the T-1 wireline, intermittent wireline failures, unexpected rearrangement of the T1-carrier route by the local telephone company in the PSTN which is serving the area in which the cell site is located, and so forth.

Frequent interruptions to the wireless service can lead to subscriber dissatisfaction and subscriber churn, or cancellation of service. Furthermore, the cell site remains nonoperational until the local telephone company, otherwise known as the local exchange carrier (LEC), responsible for the failed T-1 wireline, repairs the failed T-1 wireline. Thus, wireless calls, and including the especially critical emergency 911 wireless calls, cannot be supported by the nonoperational cell site. In other words, in the conventional cellular system architecture, there is no redundant system for ensuring that the cell site remains operational so that wireless calls, including emergency 911 calls, can be delivered.

In addition, without a redundant system for routing signals in the cellular system, cellular providers are compelled to schedule maintenance or repairs of intermittent problems in the T-1 wireline during low usage periods, such as in the middle of the night. LEC personnel costs to provide this maintenance or perform the repairs on the T-1 wireline is excessively costly due to the off-normal working hours.

To circumvent this problem, some cellular providers lease additional PSTN-provided T-1 wirelines in order to provide system redundancy between the cell sites and the MTSO. Thus, when transmission over one of the T-1 wirelines is interrupted, the redundant T-1 wireline can provide alternate routing for cell site control information and for subsequent wireless calls. Unfortunately, additional T-1 wirelines also drive up cellular system costs while leading to even more inefficient usage of T-1 wireline capacity.

Wireless calls can generally be divided into two categories, intra-local exchange calls and extra-local exchange calls. Intra-local exchange calls are those calls for which a local exchange carrier (LEC) end office is a terminating office for the call. In other words, wireless intra-local exchange calls are directed to a telephone subscriber whose telephone equipment is connected to the same LEC end office. In contrast, extra-local exchange calls are those calls in which another central office is the terminating office for the wireless call.

FIG. 1 shows a block diagram of an environment 20 in which a prior art cellular system 22 is interconnected with the public switched telecommunication network (PSTN). Cellular system 20 includes a mobile telephone switching office (MTSO) 24, a first cell site 26 and a second cell site 28. A first PSTN-provided T-1 transmission link 30 interconnects MTSO 24 and first cell site 26. A second PSTN-provided T-1 transmission link 32 interconnects MTSO 24 and second cell site 28. A PSTN-provided T-1 wireline 34 interconnects MTSO 24 to a local exchange carrier (LEC) tandem office 36. LEC tandem office 36 is a central office for the local exchange carrier in the PSTN which serves to connect other LEC offices (not shown) for the delivery of calls.

In this prior art configuration, T-1 wireline 34, otherwise known as a Type IIA link, is configured to convey both intralocal exchange and extra-local exchange calls to LEC tandem office 36. A PSTN-provided T-1 wireline 38 interconnects LEC tandem office 36 to a local exchange carrier (LEC) end office 40 having a service area 42. T-1 wireline 38 is also a Type IIA link and is configured to convey intra-local exchange calls to LEC end office 36.

A communication path for an exemplary wireless intra-local exchange call, originated at a radiotelephone 44, is through a radiofrequency link 46, to second cell site 28. The intra-local exchange call is subsequently routed through PSTN T-1 transmission link 32 to MTSO 24, then through Type IIA T-1 wireline 34 to LEC tandem office 36. LEC tandem office 36 switches the intra-local exchange call to Type IIA T-1 wireline 38, and the call is routed over Type IIA T-1 wireline 38 to LEC end office 40. LEC end office 40 subsequently routes the intra-local exchange call over a telephone link 48 to a telephone 50.

The prior art interconnection configuration illustrated in FIG. 1 results in the eventual delivery of the intra-local exchange call. Unfortunately, this intra-local exchange call does not use the PSTN efficiently and therefore incurs unnecessary and costly mileage tariffs due to its routing through LEC tandem office 36 via T-1 wirelines 34 and 38.

In order to circumvent the costly mileage tariffs, some prior art systems lease a PSTN-provided T-1 wireline between MTSO 24 and LEC end office 40, as illustrated by a dashed line 52. T-1 wireline 52, known as a Type IIB link then replaces Type IIA wireline 38 for the routing of intra-local exchange calls. This arrangement improves PSTN usage efficiency, and the lease cost of Type IIB T-1 wireline 52 is essentially the same as the lease cost of Type IIA T-1 wireline 38. However, the mileage tariff per call for Type IIB wireline 52 is zero which is significantly lower than the mileage tariff per call for Type IIA wireline 38. Unfortunately, only a slight improvement in PSTN usage efficiency results, and Type IIB T-1 wireline 52 is not cost effective if the average number of intra-local exchange calls at any given time is not great enough to support the lease cost of Type IIB T-1 wireline 52.

Thus, a need remains for a wireless communication system that provides selectable signal routing for supplying cell sites with cell site operational information and that more efficiently utilizes the PSTN-provided T-1 communication links.

SUMMARY OF THE INVENTION

Accordingly, it is an advantage of the present invention to provide a wireless communication system interconnected with a public switched telecommunications network (PSTN) and a method that selectively route communication signals along a plurality of communication paths.

Another advantage of the present invention is to provide a wireless communication system and method with improved efficiency of usage of high speed digital transmission links interconnecting the wireless communication system.

Yet another advantage of the present invention is to provide a system and method for cost-effectively delivering wireless intra-local exchange calls to a local exchange carrier end office.

The above and other advantages of the present invention are carried out in one form by a private wireless communication system interconnected with a public switched telecommunications network (PSTN) for selectable routing of communication signals along a plurality of communication paths. The system includes a mobile telephone switching office (MTSO) and a first cell site in communication with the MTSO through a first PSTN communication link. The first cell site supports a first wireless link with a first radiotelephone. A second cell site is in communication with the MTSO through a second PSTN communication link. The second cell site is also in communication with the first cell site through a third PSTN communication link. The second cell site supports a second wireless link with a second radiotelephone. The MTSO is configured to selectively route the communication signal over the first, second, and third PSTN links.

The above and other advantages of the present invention are carried out in another form by a method of delivering a wireless call to a local exchange carrier (LEC) end office through a private wireless communication system interconnected with a public switched telecommunications network (PSTN). The method calls for the steps of supporting the wireless call at the cell site. The wireless call is originated by a wireless communication device operating in the private wireless communication system. The wireless call is communicated to a mobile telephone switching office (MTSO) over a first portion of a first PSTN communication link which interconnects the cell site and the MTSO. The wireless call is switched at the MTSO to a second portion of the first PSTN communication link and transferred from the MTSO to the cell site over the second portion of the first PSTN communication link. The wireless call is conveyed from the cell site to the LEC end office over a second PSTN communication link which interconnects the cell site and the LEC end office.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 7 is an exemplary table of digital signal, level 0 (DS-0) channel allocations for the PSTN communication links interconnecting the components of the private wireless communication system.

DETAILED DESCRIPTION OF THE PREFERRED EMBODIMENTS

Figure 2:
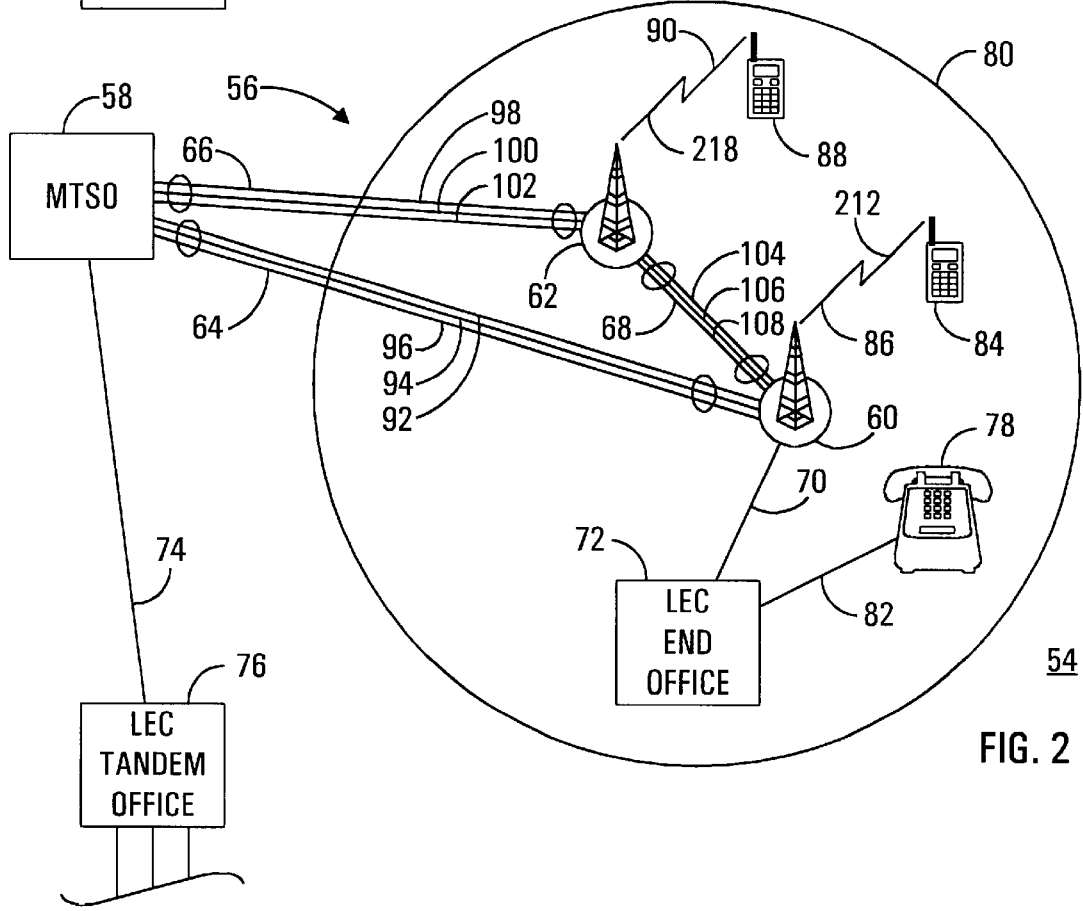
FIG. 2 shows a block diagram of an environment in which a private wireless communication system is interconnected with the public switched telecommunication network (PSTN) in accordance with a preferred embodiment of the present invention.

FIG. 2 shows a block diagram of an environment 54 in which a private wireless communication system 56 is interconnected with the public switched telecommunication network (PSTN) in accordance with a preferred embodiment of the present invention. Private wireless communication system 56 may be an analog or digital Advanced Mobile Phone Service (AMPS) cellular network, a personal communications system (PCS), Global System for Mobile Communications (GSM), and so forth.

The term "private" is used to denote that wireless system 56 is managed by a wireless service provider who is authorized to provide wireless communications exchange services. In contrast, the "public" switched telephone network (PSTN) refers to the ubiquitous telephone network accessible to all those with telephones and access privileges. However, nothing in the present invention prevents a local exchange carrier (LEC) for the PSTN to additionally function as the authorized wireless service provider for wireless system 56.

Cellular system 56 includes a MTSO 58, a first cell site 60 and a second cell site 62. A first PSTN-provided T-1 transmission link 64 interconnects MTSO 58 and first cell site 60. A second PSTN-provided T-1 transmission link 66 interconnects MTSO 58 and second cell site 62. A third PSTN-provided T-1 transmission link 68 interconnects first cell site 60 and second cell site 62, and a fourth PSTN T-1 transmission link 70 interconnects first cell site 60 to a local exchange carrier (LEC) end office 72 of the PSTN. Yet another PSTN-provided T-1 transmission link 74 interconnects MTSO 58 and a LEC tandem office 76.

LEC end office 72 is the terminating, or switching office for a telephone 78 located in a local service area 80 for LEC end office 72. Thus, telephone 78 is interconnected with LEC end office 72 over a telephone wireline 82. In addition, first and second cell sites 60 and 62, respectively, are located in local service area 80.

T-1 communication links 64, 66, 68, 70, and 74 are T-1 carrier cables leased by cellular system 56 from the local exchange carrier (LEC), or the local wireline telephone company in the PSTN which provides service in environment 54. Those skilled in the art will recognize that T-1 links may be any of several digitally multiplexed T1-carrier systems, such as copper wirelines, optical fiber cables, or microwave links. In addition, the interconnection between telephone 78 and LEC end office 72 is simplistically represented by telephone wireline 82. Conventional PSTN trunking and signal multiplexing operations are occurring between LEC end office 72 and telephone 78 which are not pertinent to the understanding of the present invention and are described in detail herein.

First cell site 60 supports communication with a first radiotelephone 84 over a first wireless link 86. Likewise, second cell site 62 supports communication with a second radiotelephone 88 over a second wireless link 90. Wireless calls originated by either of first and second radiotelephones 84 and 88, respectively, that are directed to telephone 78 are intra-local exchange calls. In other words, the wireless call originates and terminates in local service area 80. Those skilled in the art will recognize that telephone 78, first radiotelephone 84, and second radiotelephone 88 need not be limited to communication devices configured to transmit voice conversations. Rather, telephone 78, and radiotelephones 84 and 88, may be configured to transmit data, video, paging signals, and so forth.

Each of T-1 links 64, 66, 68, and 70, have a capacity of 1.544 Mbps and accommodates twenty-four digital service, level 0 (DS-0) 64 kbps channels. First, second, and third T-1 links 64, 66, and 68 are illustrated as three bundled lines, because sets of the DS-0 channels for each of first, second, and third T-1 links perform different communication functions relevant to the operation of private wireless communication system 56.

First T-1 link 64 includes a first set of DS-0 channels 92 which are allocated for communication signals between MTSO 58 and first cell site 60, a second set of DS-0 channels 94 which are allocated for alternative routing and additional capacity of communication signals between MTSO 58 and second cell site 62, and a third set of DS-0 channels 96 which are allocated for the transfer of intra-local exchange calls from MTSO 58 and eventually to LEC end office 72.

Likewise, second T-1 link 66 includes a fourth set of DS-0 channels 98 which are allocated for communication signals between MTSO 58 and second cell site 62, a fifth set of DS-0 channels 100 which are allocated for alternative routing and additional capacity of communication signals between MTSO 58 and first cell site 60, and a sixth set of DS-0 channels 102 which are allocated for the transfer of intra-local exchange calls from MTSO 58 and eventually to LEC end office 72.

Third T-1 link 68 includes a seventh set of DS-0 channels 104 which are allocated for alternative routing and additional capacity of communication signals between MTSO 58 and first cell site, an eighth set of DS-0 channels 106 which are allocated for alternative routing and additional capacity of communication signals between MTSO 58 and second cell site 62, and a ninth set of DSO channels 108 which are allocated for the transfer of intra-local exchange calls from MTSO 58 and eventually to LEC end office 72.

The separation of the DS-0 channels into different functional groups serves to provide an alternative route for communication signals if a primary communication path between MTSO 58 and one of cell sites 60 and 62 fails. The formerly unused DS-0 channels of the T-1 links between the cell sites and MTSO 58 are used for alternative routing to provide communication path diversity so that a cell site remains operational even if the primary communication path for control parameters fails. In addition, a portion of the formerly unused DS-0 channels are also used for the conveyance of intra-local exchange calls, thus eliminating the intervention of LEC tandem office 76 for intra-local exchange calls which reduces cellular system costs. The DS-0 channel allocations will be described below in connection with an exemplary embodiment of the present invention.

Figure 3:
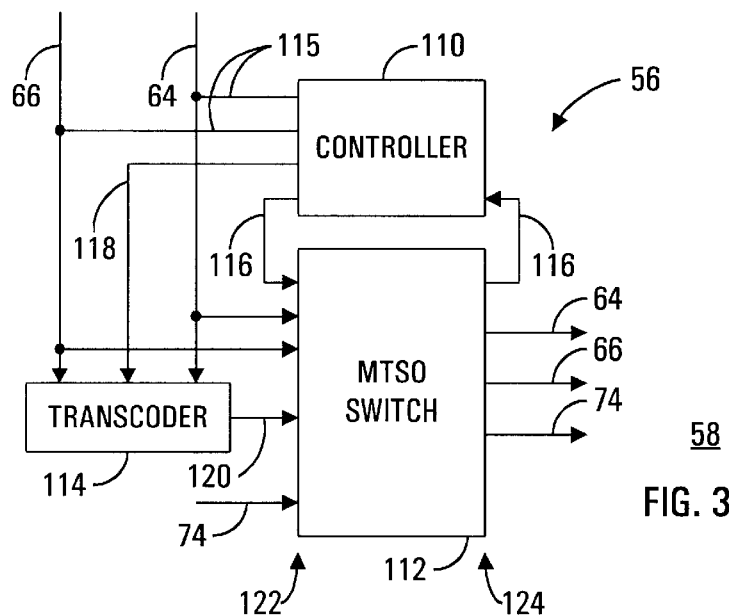
FIG. 3 shows a block diagram of a mobile telephone switching office (MTSO) in the private wireless communication system.

FIG. 3 shows a block diagram of MTSO 58 of private wireless communication system 56. MTSO 58 includes a controller 110, a MTSO switch 112, and a transcoder 114. Controller 110 is in communication with first and second cell sites 60 and 62, respectively, (FIG. 1) through first and second T-1 links 64 and 66, respectively, as represented by communication paths 115. MTSO switch 112 is in communication with controller 110 as represented by communication paths 116. Transcoder 114 is in communication with controller 110 as represented by communication path 118 and in communication with MTSO switch 112 as represented by transcoded signal path 120.

The switching activities and routing of communication signals in MTSO switch 112 is controlled by controller 110 through communication paths 116. MTSO switch 112 is configured to receive communication signals, such as voice and data, at input ports 122 of switch 112 from first and second T-1 links 64 and 66, transcoder 114 through transcoded signal path 120, and T-1 link 74 from LEC tandem office 76. MTSO switch 112 is further configured to output switched communication signals over predetermined communication paths from output ports 124 of MTSO switch 112 to T-1 links 64, 66, and 74. MTSO 58 includes additional elements for signaling, monitoring calls, location monitoring of radiotelephones, billing information, and so forth which will not be described in detail herein.

In the preferred embodiment, controller 110, MTSO switch 112, and transcoder 114 may be combined in transcoding digital crossconnect switch system known to those skilled in the art. The transcoding function compresses two or more DS-0 channels into one DS-0 channel. The digital crossconnect switch portion provides automatic protection switching for automatically rerouting or varying link or channel parameters based on link failure or user defined thresholds.

Figure 1:
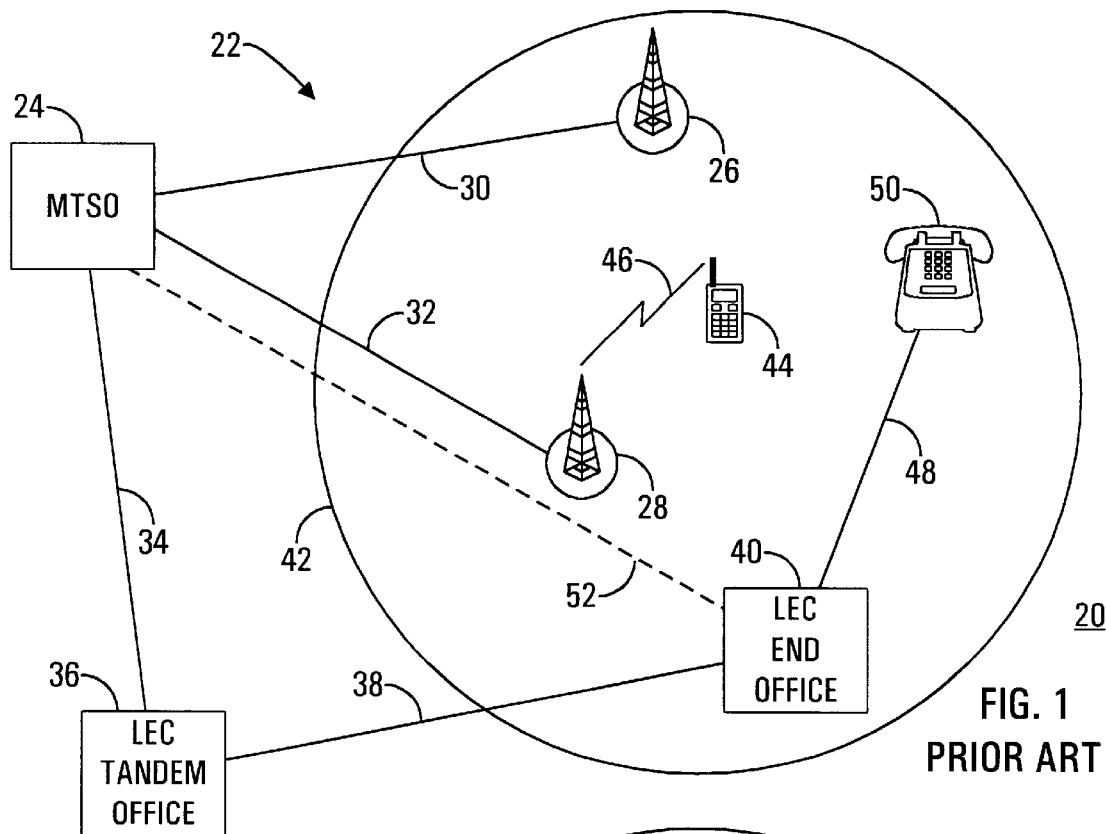
FIG. 1 shows a block diagram of an environment in which a prior art cellular system is interconnected with the public switched telecommunication network (PSTN)
Figure 4:
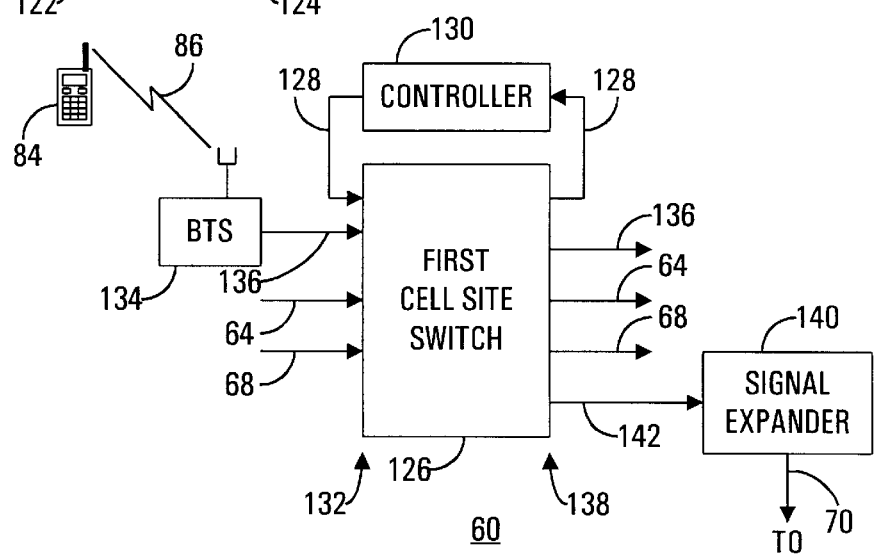
FIG. 4 shows a block diagram of a first cell site in the private wireless communication system.

FIG. 4 shows a block diagram of first cell site 60 of private wireless communication system 56 (FIG. 1). First cell site 60 includes a first cell site switch 126 in communication over communication paths 128 with a controller 130. First cell site switch 126 is configured to receive communication signals, such as voice and data, at input ports 132 of switch 126 from first and third T-1 links 64 and 68, and from a first cell site base transceiver station (BTS) 134 over a communication path 136. First cell site BTS 134 is in communication with first radiotelephone 84 over first wireless communication link 86.

First cell site switch 126 is further configured to output switched communication signals over predetermined communication paths from output ports 138 of switch 126 to BTS 134 over communication path 136 and to T-1 links 64 and 68, and to a signal expander 140 over a communication path 142. Signal expander 140 decompresses, or expands, the intra-local exchange calls which were transcoded by transcoder 114 (FIG. 3) prior to conveying the intra-local exchange calls over fourth communication link 70 to LEC end office 72 (FIG. 2). First cell site switch 126 may be a digital crossconnect system known to those skilled in the art.

Figure 5:
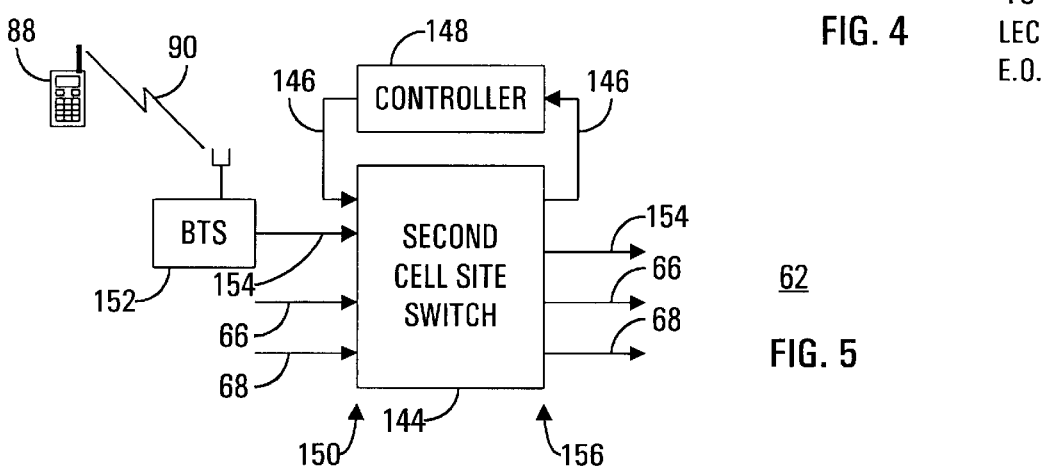
FIG. 5 shows a block diagram-of a second cell site in the private wireless communication system.

FIG. 5 shows a block diagram of second cell site 62 of private wireless communication system 56 (FIG. 2). Second cell site 62 includes a second cell site switch 144 in communication over communication paths 146 with a controller 148. Second cell site switch 144 is configured to receive communication signals, such as voice and data, at input ports 150 of switch 144 from second and third T-1 links 66 and 68, and from a second cell site base transceiver station (BTS) 152 over a communication path 154. Second BTS 152 is in communication with second radiotelephone 88 over second wireless communication link 90.

Second cell site switch 144 is further configured to output switched communication signals over predetermined communication paths from output ports 156 of second cell site switch 144 to BTS 152 over communication path 154, and to T-1 links 66 and 68. Second cell site switch 144 may be a digital crossconnect system known to those skilled in the art. Second cell site 62 includes additional elements for signaling, monitoring calls, location monitoring of radiotelephone 88, and so forth which will not be described in detail herein.

Figure 6:
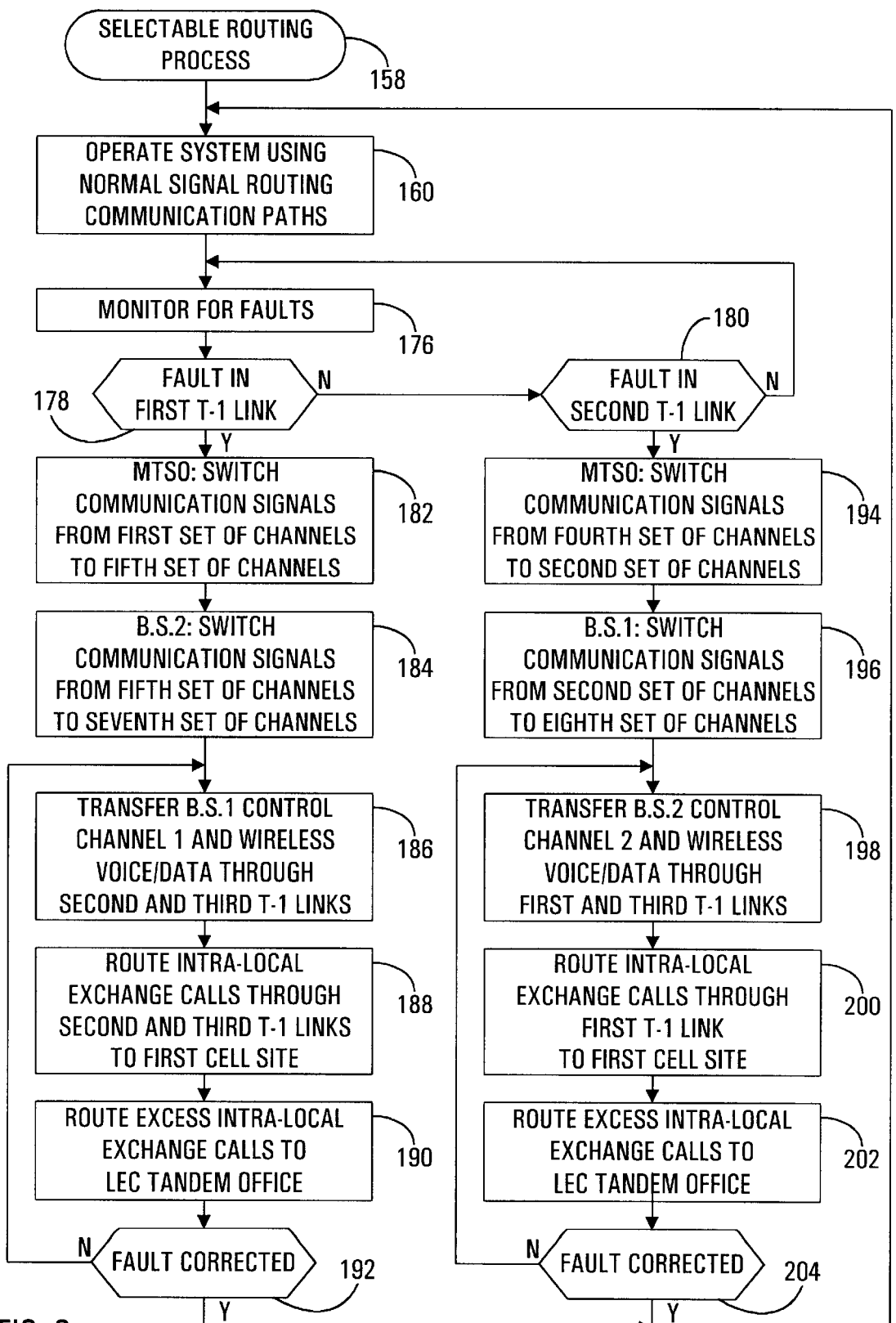
FIG. 6 is a flow chart of a selectable routing process in accordance with a preferred embodiment of the present invention.

FIG. 6 is a flow chart of a selectable routing process 158 in accordance with a preferred embodiment of the present invention. Process 158 is automatically performed within private wireless communication system in order to route communication signals along alternative communication paths in order to maintain the operational status of each of first and second cell sites 60 and 62.

Process 158 begins with a task 160. Task 160 establishes the operation of system 56 using normal signal routing communication paths. Task 160 is performed at a first instant in time upon initialization of system 56, and thereafter following the correction of a fault, or failure of transmission, in either of first and second T-1 links 64 and 66, respectively.

FIG. 7 is an exemplary table 162 of digital signal, level 0 (DS-0) channel allocations for the PSTN communication links interconnecting the components of private wireless communication system 56. Table 162 exemplifies DS-0 channel allocations for illustrative purposes. Those skilled in the art will recognize that the quantity of DS-0 channels for each of the communication functions can be adjusted to accommodate the call capacity of each of first and second cell sites 60 and 62, respectively.

Exemplary table 162 includes DS-0 channels 164 along with channel allocations, or assignments, 166 for each of DS-0 channels 164 of each of first, second, and third T-1 links 64, 66, and 68. During task 160 (FIG. 6), DS-0 channels 164 are mapped into MTSO switch 112, first cell site switch 126, and second cell site switch 144 in connection with controller 110, controller 130, and controller 148, respectively.

In this exemplary embodiment, first T-1 link 64, located between MTSO 58 (FIG. 2) and first cell site 60 (FIG. 2), is subdivided as follows: first set of channels 92 is allocated DS-0 channels 0–7, second set of channels 94 is allocated DS-0 channels 8–15, and third set of channels 96 is allocated DS-0 channels 16–23. Second T-1 link 66, located between MTSO 58 and second cell site 62 (FIG. 2), is subdivided as follows: fourth set of channels 98 is allocated DS-0 channels 0–7, fifth set of channels 100 is allocated DS-0 channels 8–15, and sixth set of channels 102 is allocated DS-0 channels 16–23. Third T-1 link 68, located between first cell site 60 and second cell site 62, is subdivided as follows: seventh set of channels 104 is allocated DS-0 channels 0–7, eighth set of channels 106 is allocated DS-0 channels 8–15, and ninth set of channels 108 is allocated DS-0 channels 16–23.

Task 160 (FIG. 6) causes system 56 to operate under "normal" signal routing along communication paths. In other words, under "normal" signal routing, MTSO 58 and first cell site 60 are communicating a first control channel 168 and wireless voice/data signals 170, for communication between first radiotelephone 84 and MTSO 58, through first set of channels 92 of first T-1 link 64. Likewise, MTSO 58 and second cell site 62 are communicating a second control channel 172 and wireless voice/data signals 174, for communication between second radiotelephone 88 and MTSO 58, through fourth set of channels 98.

In addition, under "normal" signal routing conditions, third set of channels 96 are allocated for transferring a first predetermined number of intra-local exchange calls 175. Likewise, sixth set of channels 102 and ninth set of channels 108 are allocated for transferring a second predetermined number of intra-local exchange calls 177. In the preferred embodiment, third set of channels 96 are allocated for transferring sixteen intra-local exchange calls 175 transcoded, or compressed, into eight DS-0 channels 164. In addition, sixth and ninth set of channels 102 and 108 are allocated for transferring a total of eight intra-local exchange calls 177. This configuration allows a total of twenty-four intra-local exchange calls to eventually be conveyed from first cell site 60 to LEC end office 72.

Under "normal" signal routing conditions, second set of channels 94, fifth set of channels 100, sixth set of channels 104, and seventh set of channels 106 are unused, but are reserved as an alternate path if there should be a fault in first or second T-1 links 64 and 66, respectively.

Those skilled in the art will recognize, that under normal signal routing conditions the unused channels reserved for alternate signal routing may be utilized for additional call transfer or signaling parameters. Moreover, those skilled in the art will recognize that additional DS-0 channels may be used as control channels to convey signaling parameters to the cell sites. In addition, wireless voice/data signals 170 and wireless voice/data signals 174 may be transcoded or otherwise compressed at first and second cell sites 60 and 62, respectively, and will not be discussed in detail herein.

With reference back to process 158 (FIG. 6), in response to task 160, system 56 a task 176 is performed by system 56. Task 176 is a continuous process which is occurring in conjunction with conventional wireless calls, system signaling, and so forth. Task 176 causes MTSO 58 (FIG. 2), first cell site 60, and second cell site 62 to monitor for faults in the PSTN T-1 transmission links. In particular, system 56 monitors for faults in first and second T-1 links 64 and 66 (FIG. 2). Faults may include a break in the T-1 wireline, intermittent failures, or scheduled maintenance which would cause a disruption of transmission from MTSO 58 to either of first and second cell sites 60 and 62 (FIG. 2).

In connection with task 176, a query task 178 determines if there is a fault in first T-1 link 64. When query task 178 determines there is no fault in first T-1 link 64, a concurrent query task 180 determines if there is a fault in second T-1 link 66. When query task 180 determines there is no fault in second T-1 link 66, process 158 loops back to task 176 to continue monitoring for faults in the T-1 links. Accordingly, system 56 continues to operating using the "normal" signal routing configuration described in connection with task 160

When query task 178 determines that there is a fault in first T-1 link 64 (FIG. 2) at a later instant in time, selectable routing process 158 proceeds to a task 182. Task 182 causes MTSO switch 112 (FIG. 3) to switch the communication signals from first set of channels 92 (FIG. 7) on first T-1 link 64 to fifth set of channels 100 (FIG. 7) on second T-1 link 66.

In response to the determination of a fault in first T-1 link 64 in query task 178 and in connection with task 182, a task 184 is performed. Task 184 causes second cell site switch 144 (FIG. 5) to switch the communication signals from fifth set of channels 100 on second T-1 link 66 to seventh set of channels 104 (FIG. 7) on third T-1 link 68 (FIG. 2). As a result of tasks 182 and 184, an alternate communication path is established between MTSO 58 and first cell site 60.

Following tasks 182 and 184, a task 186 is performed. Task 186 causes the communication of first control channel 168 (FIG. 7) and subsequent wireless voice/data signals 170 to be transferred over second and third T-1 links 66 and 68, respectively.

In addition to task 186, a task 188 is performed. Task 188 causes system 56 to route subsequent transcoded intra-local exchange calls through sixth set of channels 102 (FIG. 7) and ninth set of channels 108 (FIG. 7). Accordingly, in the exemplary embodiment, switching and controlling occurs at MTSO 58 and second cell site 62 to accommodate the transfer of up to eight transcoded intra-local exchange calls 177, for subsequent expansion by signal expander 140 (FIG. 4) and switching to fourth T-1 link 70 (FIG. 2) of sixteen wireless intra-local exchange calls.

Following task 188, a task 190 is performed. Task 190 is an optional task, as denoted by the dashed line box. Task 190 causes MTSO 58 to monitor the quantity of intra-local exchange calls 177 on second T-1 link 66. When sixth set of channels 102 is transferring all eight transcoded intra-local exchange calls, MTSO 58 routes excess, or additional, intra-local exchange calls to LEC tandem office 76 (FIG. 2) through T-1 link 74 (FIG. 2).

Thus, an alternate path is established for the communication of communication signals between MTSO 58 and first cell site 60. These communication signals include first control channels 168 (FIG. 7), wireless voice/data communication signals 170, and intra-local exchange calls 177.

Following the establishment of the alternate communication path in tasks 186 and 188, a query task 192 is performed. Query task 192 causes system 56 (FIG. 2) to monitor first T-1 link 64 (FIG. 2) to determine if the fault in first T-1 link 64 (FIG. 2) is corrected. In other words, query task 192 determines if transmission of communication signals over first T-1 link 64 can be re-established.

When query task 192 determines that the fault is not corrected, program control loops back to task 186 to continue the transfer of communication signals over the established alternate path.

When query task 192 determines that the fault in first T-1 link 64 is corrected, process 158 loops back to task 160 to resume operation of system 56 using the normal signal routing communication paths.

With reference back to query task 180, at another instant in time, when query task 180 determines that there is a fault in second T-1 link 66 (FIG. 2), selectable routing process 158 proceeds to a task 194. Task 194 causes MTSO switch 112 (FIG. 3) to switch the communication signals from fourth set of channels 98 (FIG. 7) on second T-1 link 66 to second set of channels 94 (FIG. 7) on first T-1 link 64.

In response to the determination of a fault in second T-1 link 66 and in connection with task 194, a task 196 is performed. Task 196 causes first cell site switch 126 (FIG. 4) to switch the communication signals from second set of channels 94 on first T-1 link 64 to eighth set of channels 106 (FIG. 7) on third T-1 link 68 (FIG. 2). As a result of tasks 194 and 196, an alternate communication path is established between MTSO 58 and second cell site 62.

Following tasks 194 and 196, a task 198 is performed. Task 198 causes the communication of second control channel 172 (FIG. 7) and subsequent wireless voice/data signals 174 to be transferred over first and third T-1 links 64 and 68, respectively.

In addition to task 198, a task 200 causes system 56 to route transcoded intra-local exchange calls 175 from MTSO 58 through third set of channels 96 (FIG. 7). Accordingly, in the exemplary embodiment, first cell site switch 126 (FIG. 4) receives up to eight transcoded intra-local exchange calls from first T-1 link 64, for subsequent expansion by signal expander 140 (FIG. 4) and switching to fourth T-1 link 70 (FIG. 2) of sixteen wireless intra-local exchange calls.

Following task 200, a task 202 is performed. Task 202 is an optional task, as denoted by the dashed line box. Task 202 causes MTSO 58 to monitor the quantity of intra-local exchange calls 175 on first T-1 link 64. When third set of channels 96 is transferring all eight transcoded intra-local exchange calls, MTSO 58 routes excess, or additional, intra-local exchange calls to LEC tandem office 76 (FIG. 2) through T-1 link 74 (FIG. 2).

Thus, an alternate path is established for the communication of communication signals between MTSO 58 and first cell site 60. These communication signals include second control channel 172 (FIG. 7), wireless voice/data communication signals 174, and intra-local exchange calls 175.

Concurrent with tasks 198, 200, and 202, a query task 204 is performed. Query task 204 causes system 56 (FIG. 2) to monitor second T-1 link 66 (FIG. 2) to determine if the fault in second T-1 link 66 (FIG. 2) is corrected. In other words, query task 204 determines if transmission of communication signal over second T-1 link 66 can be re-established.

When query task 204 determines that the fault is not corrected, program control loops back to task 198 to continue the transfer of communication signals over the established alternate communication path.

When query task 204 determines that the fault in second T-1 link 66 is corrected, process 158 loops back to task 160 to resume operation of system 56 using the normal signal routing configuration. Thus, selectable routing process 158 automatically reroutes communication signals over interconnecting PSTN communication paths arranged in a ring architecture between MTSO 58, first cell site 60, and second cell site 62, so that first and second cell sites 60 and 62 remain operational during a T-1 link failure, or fault. Additionally, the T-1 links are more efficiently utilized by conveying intra-local exchange calls 175 and 177 directly to LEC end office 72, and bypassing LEC Tandem Office 76 (FIG. 2).

Figure 8:
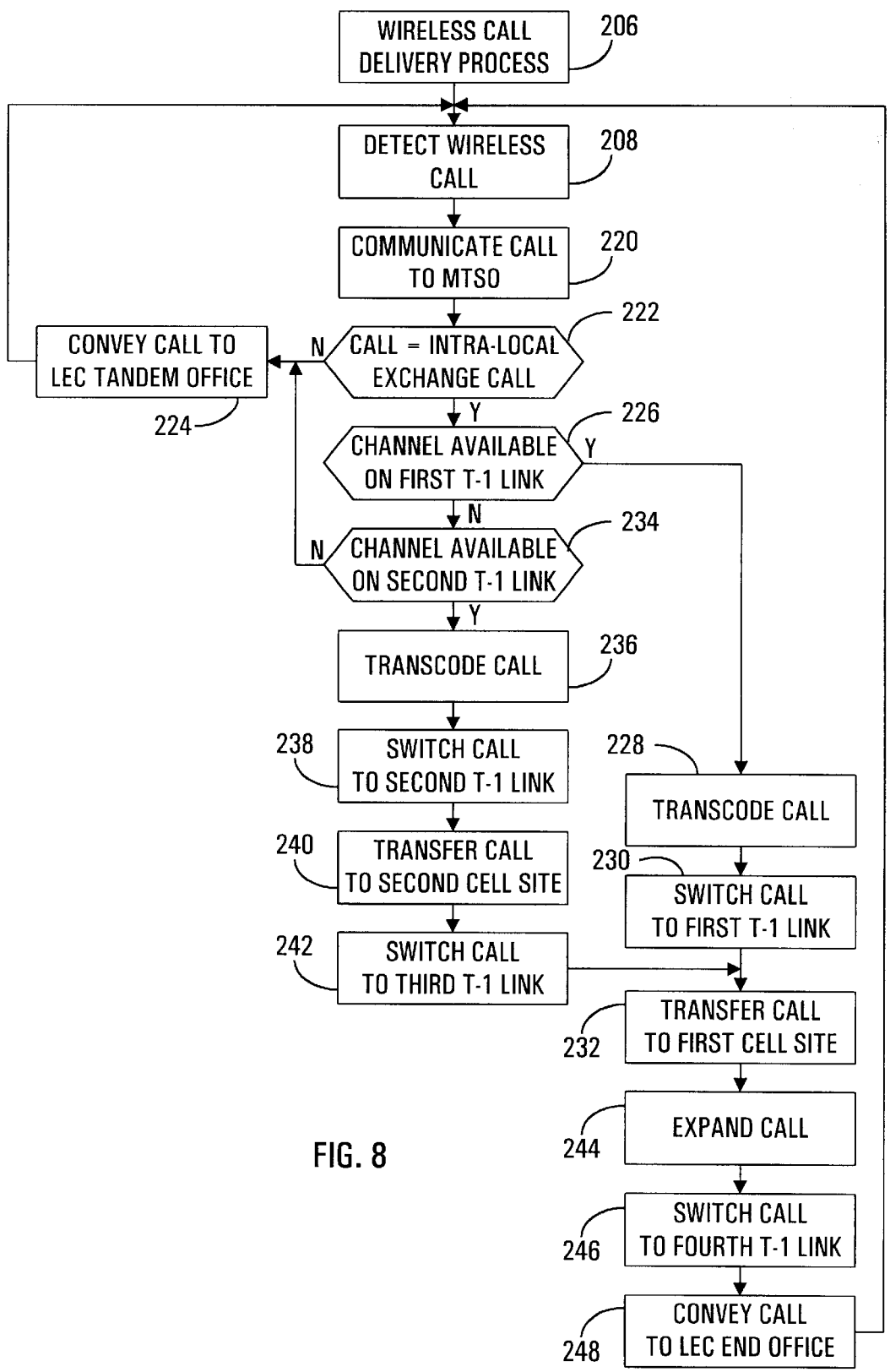
FIG. 8 is a flow chart of a wireless call delivery process performed by the private wireless communication system.

FIG. 8 is a flow chart of a wireless call delivery process 206 performed by private wireless communication system 56. Process 206 occurs following the establishment of communication paths in selectable routing process 158 and following the exchange of cell cite control signals between MTSO 58 and each of first and second cell sites 60 and 62, respectively Process 206 begins with a task 208. Process 206 is performed in response to wireless calls which are originated by radiotelephones through either of first and second cell sites 60 and 62, respectively. Task 208 causes system 56 to detect a wireless call. The wireless call is detected by the conventional exchange of signaling parameters between the MTSO and a cell site, and between the cell site and a radio telephone.

Referring momentarily to FIG. 2, through the conventional exchange of signaling parameters in task 208, system 56 determines if the wireless call is a first wireless call 212 or a second wireless call 218. First wireless call 212 is a call that is originated by first radiotelephone 84 over first wireless communication link 86 through the support of first cell site 60. Whereas, second wireless call 218 is a call that is originated by second radiotelephone 88 over second wireless communication link 90 through the support of second cell site 62.

In response to detection task 208 of process 206 (FIG. 8), a task 220 communicates the wireless call to MTSO. The wireless call, either first wireless call 212 or second wireless call 218, is transferred to MTSO 58 through either the primary or the alternate communication path described in connection with process 158 (FIG. 6) and exemplary table 162 (FIG. 7).

Accordingly, as a wireless call is detected, task 208 identifies which one of first and second cell sites 60 and 62, respectively, is supporting the wireless call. Additionally, communication task 220 transfers the wireless call through either a primary or alternate communication path for the identified cell site in accordance with process 158. Hereinafter, for clarity of illustration, wireless call delivery process 206 will be described in connection with first wireless call 212. However, it should be readily apparent that the sequence of tasks for delivering a wireless call is the same whether the wireless call is first wireless call 212 or second wireless call 218.

Following communication of first wireless call 212 to MTSO 58 (FIG. 2), process 206 proceeds to a query task 222. Query task 222 causes MTSO 58 to determine if first wireless call 212 is an intra-local exchange call.

When first wireless call 212 is not an intra-local exchange call, process 206 proceeds to a task 224. Task 224 causes MTSO 58 (FIG. 2) to convey first wireless call 212 to LEC tandem office 76 (FIG. 2) for subsequent delivery of first wireless call 212 to another central office (not shown). Following task 224, program control loops back to task 208 to continue detecting and delivering subsequent wireless calls.

When query task 222 identifies first wireless call 212 as an intra-local exchange call directed to a telephone served by LEC end office 72, such as telephone 78 (FIG. 2), process 206 proceeds to a query task 226.

Query task 226 determines if a DS-0 channel is available on first T-1 link 64 (FIG. 2) for the transfer of wireless intralocal exchange call 212. When one of DS-0 channels 164 (FIG. 7) of third set of channels 96 (FIG. 7) is available, program control proceeds to a task 228.

Task 228 causes wireless intra-local exchange call 212 to be transcoded, or compressed, by transcoder 114 (FIG. 3). In other words, the intra-local exchange call is compressed such that call 212 and another intra-local exchange call, each being a 64 kbps pulse code modulated (PCM) digital voice signal, are combined into a single DS-0 channel.

Following transcoding task 228, a task 230 is performed. Task 230 causes transcoded intra-local exchange call 212 to be switched to one of DS-0 channels 164 (FIG. 7) from third set of channels 96. In response to task 230, a task 232 is performed, which will be described below.

When query task 226 determines that a DS-0 channel is not available on first T-1 link 64 (FIG. 2) for the transfer of wireless intra-local exchange call 212, program control proceeds to query task 234. In other words, query task 226 determines when third set of DS-0 channels 96 are fully occupied by transferring sixteen wireless intra-local exchange calls.

Query task 234 determines if a DS-0 channel is available on second T-1 link 66 (FIG. 2) for the transfer of wireless intra-local exchange call 212. In other words, query task 234 determines if sixth set of DS-0 channels 102 (FIG. 7) are fully occupied by transferring eight wireless intra-local exchange calls when third set of DS-0 channels 96 are transferring sixteen intra-local exchange calls. Alternatively, sixth set of DS-0 channels 102 are fully occupied by transferring sixteen wireless intra-local exchange calls when transmission over first T-link 64 is interrupted.

When query task 234 determines that a DS-0 channel is not available on second T-1 link 66, program control loops back to task 224. Task 224 causes wireless intra-local exchange call 212 to be conveyed to LEC tandem office 76 (FIG. 2) prior to being conveyed to LEC end office 72 (FIG. 2).

When query task 234 determines that a DS-0 channel is available from sixth set of channels 102, process 206 proceeds to a task 236. Task 236 performs a similar function as task 228 by transcoding wireless intra-local exchange call 212.

Following transcoding task 236, a task 238 is performed. Task 238 causes MTSO switch 112 (FIG. 3) to switch transcoded intra-local exchange call 212 to one of DS-0 channels 164 (FIG. 7) of sixth set of channels 102.

Next, a task 240 causes intra-local exchange call 212 to be transferred over second T-1 link 66 to second cell site 62 (FIG. 2).

Following task 240, a task 242 causes second cell site switch 144 (FIG. 5) to switch intra-local exchange call 212 from second T-1 link 66 to third T-1 link 68. Intra-local exchange call 212 is switched into one of DS-0 channels 164 (FIG. 7) of ninth set of channels 108.

Following either of tasks 230 or 242, task 232 if performed. Task 232 causes intra-local exchange call 212 to be transferred to first cell site 60. If task 232 follows switching task 230, intra-local exchange call 212 is transferred to first cell site 60 over first T-1 link 64. Alternatively, if task 232 follows switching task 242, intra-local exchange call 212 is transferred to first cell site 60 over third T-1 link 68.

Following task 232, a task 244 is performed. Task 244 causes signal expander 140 (FIG. 4) to expanded transcoded wireless intra-local exchange call 212 to restore the call 212 to the standard 64 kbps PCM digital voice conversation recognizable by LEC end office 72 (FIG. 2).

Following task 244, a task 246 is performed. Task 246 causes first cell site switch 126 (FIG. 4) to switch intra-local exchange call 212 to fourth T-1 link 70 (FIG. 2). Up to twenty-four wireless intra-local exchange calls (not shown), including intra-local exchange call 212, are switched to fourth T-1 link 70.

Following task 246, a task 248 is performed. Task 248 causes the up to twenty-four wireless intra-local exchange calls, including intra-local exchange call 212, to be conveyed to LEC end office 72 (FIG. 2) for delivery to a telephone served by LEC end office 72, such as telephone 78.

Accordingly, process 206 delivers a intra-local exchange call directly to the LEC end office, bypassing the LEC tandem office, thus saving the cellular provider, and subsequently the cellular subscriber the mileage tariffs associated with routing intra-local exchange calls through the LEC tandem office. Following task 248, process 206 loops back to task 208 to continue monitoring for, detecting, and delivering wireless calls.

In summary, a private wireless communication system interconnected with a public switched telecommunications network (PSTN) and a method are described that selectively route communication signals along a plurality of communication paths. The MTSO and cell sites are connected via PSTN-provided T-1 links in a ring formation, and specialized switching at each of the locations automatically reroutes communication signals so that the cell sites remain operational even when the primary communication path is interrupted. In addition, the private wireless communication system utilizes a T-1 link between a cell site and a LEC end office and efficiently routes intra-local exchange calls that terminate at that LEC end office through the ring formation and over the T-1 link between the cell site and LEC end office. Thus, this call delivery process cost effectively and efficiently utilizes spare DS-0 channels on the T-1 links to deliver intra-local exchange calls.

Although the preferred embodiments of the invention have been illustrated and described in detail, it will be readily apparent to those skilled in the art that various modifications may be made therein without departing from the spirit of the invention or from the scope of the appended claims. For example, the principles of this invention can be adapted to accommodate more than two cell sites located in the local service area for the LEC end office. In addition, various voice conversation compression schemes may be employed in order to transfer even more transcoded intra-local exchange calls to the first base station for eventual conveyance to the LEC end office.

What is claimed is:

1. A private wireless communication system interconnected with a public switched telecommunications network (PSTN) for selectable routing of communication signals along a plurality of communication paths, said system comprising:

a mobile telephone switching office (MTSO);

a first cell site in communication with said MTSO through a first PSTN communication link, said first cell site supporting a first wireless link with a first radiotelephone; and a second cell site in communication with said MTSO through a second PSTN communication link and in communication with said first cell site through a third PSTN communication link, said second cell site supporting a second wireless link with a second radiotelephone, wherein said MTSO is configured to selectively route said communication signals over said first, second, and third PSTN communication links.

2. A system as claimed in claim 1 wherein a portion of said communication signals is allocated for communication between said first cell site and said MTSO through said first PSTN communication link at a first instant, and said first cell site includes a switch in communication with each of said first and third PSTN communication links, said switch being configured to cause said first cell site to alternatively communicate said portion of said communication signals to said MTSO through said third and said second PSTN communication links at a second instant.

3. A system as claimed in claim 2 wherein a second portion of said communication signals is allocated for communication between said second cell site and said MTSO through said second PSTN communication link at a third instant, and said second cell site includes a second switch in communication with each of said second and said third PSTN communication links, said second switch being configured to cause said second cell site to alternatively communicate said second portion of said communication signals to said MTSO through said third and said first PSTN communication links at a fourth instant.

4. A system as claimed in claim 1 wherein said first cell site is in communication with a local exchange carrier (LEC) end office through a fourth PSTN communication link, said fourth PSTN communication link being configured to convey a subset of said communication signals from said first cell site to said LEC end office.

5. A system as claimed in claim 4 wherein said communication signals include wireless calls, said first cell site is configured to support a first plurality of wireless calls, said second cell site is configured to support a second plurality of wireless calls, and said MTSO comprises:

a controller, in communication with said first and said second cell sites through said first and second PSTN communication links, for identifying ones of said first and second plurality of wireless calls which are intra-local exchange calls; and a MTSO switch in communication with said controller, said MTSO switch being configured to switch a portion of said identified intra-local exchange calls to said first PSTN communication link at a first instant, said intra-local exchange calls forming said subset of communication signals.

6. A system as claimed in claim 5 wherein said first cell site includes a first cell site switch coupled between said first and fourth PSTN communication links, said first cell site switch being configured to switch said portion of said intra-local exchange calls from said first PSTN communication link to said fourth PSTN communication link.

7. A system as claimed in claim 5 wherein:

said MTSO switch is further configured to route another portion of said identified intra-local exchange calls to said second cell site through said second PSTN communication link at a second instant; and said second cell site includes a second cell site switch in communication with said second PSTN communication link for switching intra-local exchange calls from said second communication link to said third PSTN communication link in order to route intra-local exchange calls to said first cell site.

8. A system as claimed in claim 5 wherein:

said identified intra-local exchange calls are a first portion of intra-local exchange calls;

said MTSO switch is further configured to concurrently route a second portion of intra-local exchange calls to said second cell site through said second PSTN communication link;

said second cell site includes a second cell site switch coupled between said second and third PSTN communication links and configured to switch said second portion of intra-local exchange calls to said third PSTN communication link; and said first cell site includes a first cell site switch in communication with said first and said third PSTN communication links, said first cell site switch being configured to route said first and second portions of said intra-local exchange calls to said fourth PSTN communication link.

9. A system as claimed in claim 5 wherein:

said MTSO further comprises a signal compressor in communication with said controller and said MTSO switch, said signal compressor being configured to compress said identified intra-local exchange calls prior to routing said identified intra-local exchange calls over said first PSTN communication link; and said first cell site includes a signal expander in communication with said first and said fourth PSTN communication links and configured to expand said compressed intra-local exchange calls to form said subset of communication signals.

10. A system as claimed in claim 1 wherein:

said first PSTN communication link includes a first set of channels allocated for communication between said MTSO and said first cell site and a second set of channels allocated for communication between said MTSO and said second cell site;

said first cell site includes a first switch portion for switching a first plurality of said communication signals from said second set of channels to said third PSTN communication link;

said second PSTN communication link includes a third set of channels allocated for communication between said MTSO and said second cell site and a fourth set of channels allocated for communication between said MTSO and said first cell site;

said second cell site includes a second switch portion for switching a second plurality of said communication signals from said fourth set of channels to said third PSTN communication link; and said third PSTN communication link includes a fifth set of channels allocated for transfer of said first plurality of said communication signals and a sixth set of channels allocated for transfer of said second communication signals.

11. A system as claimed in claim 10 wherein each of said first, second, and third PSTN communication links are T-1 digital transmission links.

12. A system as claimed in claim 10 wherein said first cell site is in communication with a local exchange carrier (LEC) end office through a fourth T-1 digital transmission link, said fourth T-1 link being configured to convey intra-local exchange calls controlled by each of said first and second cell sites to said LEC end office.

13. A method of delivering a wireless call to a local exchange carrier (LEC) end office through a private wireless communication system interconnected with a public switched telecommunications network (PSTN), said method comprising the steps of:

supporting said wireless call at said cell site, said wireless call being originated by a wireless communication device operating in said private wireless communication system;

communicating said wireless call to a mobile telephone switching office (MTSO) over a first portion of a first PSTN communication link which interconnects said cell site and said MTSO;

switching, at said MTSO, said wireless call to a second portion of said first PSTN communication link;

transferring said wireless call from said MTSO to said cell site over said second portion of said first PSTN communication link; and conveying said wireless call from said cell site to said LEC end office over a second PSTN communication link which interconnects said cell site and said LEC end office.

14. A method as claimed in claim 13 further comprising the step of identifying said wireless call as an intra-local exchange call, said intra-local exchange call being a call for which said LEC end office is a terminating office, so that said switching, transferring, and conveying steps are performed when said wireless call is identified as said intra-local exchange call.

15. A method as claimed in claim 14 wherein said cell site is a first cell site, said private wireless communication system includes a second cell site, and said method further comprises the steps of:

transferring a first plurality of said intra-local exchange calls over said second portion of said first PSTN communication link, said first plurality of said intra-local exchange calls including said wireless call;

transferring a second plurality of said intra-local exchange calls over a third PSTN communication link which interconnects said MTSO and said second cell site;

transferring said second plurality of said intra-local exchange calls over a fourth PSTN communication link which interconnects said second cell site and said first cell site; and combining said first plurality and said second plurality of said intra-local exchange calls for conveyance to said LEC end office over said second PSTN communication link.

16. A method as claimed in claim 13 wherein said cell site is a first cell site, said private wireless communication system includes a second cell site in communication with said MTSO through a third PSTN communication link, and said method further comprises the steps of:

supporting a second wireless call at said second cell site;

routing said second wireless call from said second cell site to said first cell site through a fourth PSTN communication link which interconnects said first and second cell sites;

switching, at said first cell site, said second wireless call to said first PSTN communication link; and communicating said second wireless call to said MTSO from said second cell site over said first PSTN communication link.

17. A method as claimed in claim 13 wherein said cell site is a first cell site, said wireless communication network includes a second cell site, and said method further comprises the steps of:

supporting a second wireless call at said second cell site, said second wireless call being originated by a second wireless communication device operating in said private wireless communication system;

communicating said second wireless call to said MTSO over a third PSTN communication link which interconnects said second cell site and said MTSO;

switching, at said MTSO, said second wireless call from said third PSTN communication link to said second portion of said first PSTN communication link;

transferring said second wireless call from said MTSO to said first cell site; and conveying said second wireless call from said first cell site to said LEC end office over said second PSTN communication link.

18. A method as claimed in claim 17 additionally comprising the steps of:

supporting a third wireless call at said second cell site;

routing said third wireless call through a fourth PSTN communication link which interconnects said first and said second cell sites;

switching, at said first cell site, said third wireless call to said first PSTN communication link; and communicating said third wireless call to said MTSO from said first cell site over said first PSTN communication link.

19. A method as claimed in claim 17 wherein said second portion of said first PSTN communication link is configured to transfer a predetermined number of wireless calls, and said method further comprises the steps of:

confirming said second portion of said first PSTN communication link is transferring said predetermined number of wireless calls;

transferring, in response to said confirming step, said first and second wireless calls from said MTSO to said second cell site over said third PSTN communication link;

switching, at said second cell site, said wireless calls to said fourth PSTN communication link; and transferring said wireless calls from said second cell site to said first cell site over said fourth PSTN communication link prior to said conveying step.

20. A method as claimed in claim 13 further comprising the steps of:

compressing said wireless call in response to said switching step; and expanding, at said cell site, said compressed wireless call prior to said conveying step.

21. A method as claimed in claim 13 further comprising the step of delivering cell site signaling parameters between said cell site and said MTSO on a control channel of said first portion of said first communication link.

22. A method as claimed in claim 21 wherein said delivering step occurs at a first instant, said cell site is a first cell site, said private wireless communication system includes a second cell site, and said method further comprises the steps of:

routing said first cell site signaling parameters through a first cell site control channel of a third PSTN communication link which interconnects said MTSO and said second cell site at a second instant; and routing said first cell site signaling parameters through a first cell site control channel portion of a fourth PSTN communication link which interconnects said first and said second cell sites during said second instance.

23. A method as claimed in claim 22 wherein second cell site signaling parameters are communicated between said second cell site and said MTSO on a control channel of said third PSTN communication link cell site at a third instant, and said method further comprises the steps of:

routing said second cell site signaling parameters through a second cell site control channel of said first PSTN communication link at a fourth instant; and routing said second cell site signaling parameters through a second cell site control channel portion of said fourth PSTN communication link during said fourth instant.

24. A private wireless communication system interconnected with a public switched telecommunications network (PSTN) for selectable routing of communication signals along a plurality of communication paths, said system comprising:

a mobile telephone switching office (MTSO);

a first cell site in communication with said MTSO through a first PSTN T-1 digital transmission link and in communication with a local exchange carrier (LEC) end office through a second PSTN T-1 digital transmission link; and a second cell site in communication with said MTSO through a third PSTN T-1 digital transmission link and in communication with said first cell site through a fourth PSTN T-1 digital transmission link, wherein said first and second cell sites are located in a local service area of said LEC end office and said MTSO is configured to selectively route said communication signals over said first, second, third, and fourth PSTN T-1 digital transmission links.

25. A system as claimed in claim 24 wherein:

said first PSTN T-1 link includes a first set of digital service, level 0 (DS-0) channels allocated for communication between said MTSO and said first cell site, a second set of DS-0 channels allocated for communication between said MTSO and said second cell site, and a third set of DS-0 channels allocated for communication between said MTSO and said LEC end office;

said first cell site includes a first digital cross-connect switch portion for switching a first plurality of said communication signals from said second set of DS-0 channels to said fourth PSTN T-1 link and a second digital cross-connect switch portion for switching a second plurality of said communication signals from said third set of DS-0 channels to said second T-1 link;

said third PSTN T-1 link includes a fourth set of DS-0 channels allocated for communication between said MTSO and said second cell site, a fifth set of DS-0 channels allocated for communication between said MTSO and said first cell site, and a sixth set of DS-0 channels allocated for communication between said MTSO and said LEC end office;

said second cell site includes a third digital cross-connect switch portion for switching a third and a fourth plurality of said communication signals from said fifth and sixth sets of DS-0 channels, respectively, to said fourth PSTN T-1 link; and said fourth PSTN T-1 link includes a seventh set of DS-0 channels allocated for transfer of said first plurality of said communication signals, a eighth set of DS-0 channels allocated for transfer of said third plurality of said communication signals, and a ninth set of DS-0 channels for transfer of said fourth plurality of said communication signals;

wherein said second digital cross-connect switch portion is further configured to switch said fourth plurality of said communication signals from said ninth set of DS-0 channels to said fourth PSTN T-1 link.

26. A system as claimed in claim 25 wherein said second and said fourth plurality of said communication signals are wireless intra-local exchange calls, and said MTSO includes:

a controller configured to identify said intra-local exchange calls; and an MTSO digital cross-connect switch in communication with said controller and configured to selectively route said identified intra-local exchange calls over said third, sixth, and ninth sets of DS-0 channels to said second digital cross-connect switch portion.

27. A system as claimed in claim 26 wherein:

said MTSO further comprises a transcoder in communication with said controller and said MTSO switch, said transcoder being configured to transcode said identified intra-local exchange calls prior to routing a first subset of said intra-local exchange calls over said third set of DS-0 channels and prior to routing a second subset of said intra-local exchange calls over said sixth and ninth sets of DS-0 channels; and said first cell site further comprises signal expander coupled between an output of said second switch portion and said second PSTN T-1 link, said signal expander configured to expand said first and second subsets of said intra-local exchange calls.

28. A system as claimed in claim 27 wherein said signal expander is configured to expand said first and said second subsets of said intra-local exchange calls to form up to twenty-four voice conversations, and said second PSTN T-1 link includes approximately twenty-four DS-0 channels such that one each of said twenty-four voice conversations is to conveyed to said LEC end office over one each of said twenty-four DS-0 channels of said second PSTN T-1 link.

29. A system as claimed in claim 24 wherein said first plurality of communication signals includes at least one control channel for said second cell site and said third plurality of communication signals includes at least one control channel for said first cell site.

* * * * *